US010564183B2

(12) United States Patent
Hirade

(10) Patent No.: US 10,564,183 B2
(45) Date of Patent: Feb. 18, 2020

(54) SCANNING PROBE MICROSCOPE AND SURFACE IMAGE CORRECTION METHOD

(71) Applicant: Shimadzu Corporation, Kyoto (JP)

(72) Inventor: Masato Hirade, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/184,013

(22) Filed: Nov. 8, 2018

(65) Prior Publication Data

US 2019/0277882 A1    Sep. 12, 2019

(30) Foreign Application Priority Data

Mar. 8, 2018 (JP) .................................. 2018-041693

(51) Int. Cl.
*G01Q 30/06* (2010.01)
*G06K 9/46* (2006.01)
*G06K 9/32* (2006.01)

(52) U.S. Cl.
CPC .......... *G01Q 30/06* (2013.01); *G06K 9/3275* (2013.01); *G06K 9/4604* (2013.01)

(58) Field of Classification Search
CPC ..... G01Q 30/06; G06K 9/3275; G06K 9/4604
USPC ........... 250/306, 307, 309, 310, 311; 850/11
See application file for complete search history.

(56) References Cited

U.S. PATENT DOCUMENTS

| 2001/0033713 | A1* | 10/2001 | Harris | G02B 6/4298 385/33 |
| 2004/0238731 | A1* | 12/2004 | Nishiyama | G02B 21/0024 250/234 |
| 2007/0115457 | A1* | 5/2007 | Matsuzawa | G01M 11/0264 356/124 |
| 2012/0138814 | A1* | 6/2012 | Preikszas | H01J 37/1474 250/396 R |

FOREIGN PATENT DOCUMENTS

JP    2014-211372 A    11/2014

* cited by examiner

*Primary Examiner* — Nicole M Ippolito
(74) *Attorney, Agent, or Firm* — Maier & Maier, PLLC

(57) ABSTRACT

An inclination correcting processor performs an image process for correcting inclination of a surface image to a Z direction intersecting an X direction and a Y direction on the surface image of a sample which has been acquired from scanning by a scanning processor. The inclination correcting processor extracts a plurality of pixels from the surface image on a straight line along a predetermined direction and corrects inclination of the surface image based on luminance of the extracted pixels. In a case where correction is performed on the surface image of the sample having a flat surface at least in the one direction (P direction) intersecting the X direction and the Y direction, the inclination correcting processor performs the image process such that the predetermined direction (a direction of a straight line 28) substantially matches the one direction (P direction).

9 Claims, 9 Drawing Sheets

SCANNING PROBE MICROSCOPE AND SURFACE IMAGE CORRECTION METHOD

FIELD

The present invention relates to a scanning probe microscope including a cantilever that is relatively displaced along a surface of a sample and a surface image correcting method for correcting a surface image of the sample which has been acquired by the scanning probe microscope.

BACKGROUND

For example, in an optical lever type of scanning probe microscope, a probe of a cantilever is caused to move along a surface of a sample such that bending of the cantilever is detected, and thereby it is possible to obtain a surface image (unevenness image) of the sample (for example, see Patent Literature 1 to be described below). This type of scanning probe microscope includes an optical irradiation unit that irradiates the cantilever with a light beam and an optical detection unit that receives a reflected beam from the cantilever.

In a case where the sample is not horizontally placed, a surface, which should be horizontal in a proper posture, is inclined, and variations in luminance based on such inclination appear on the surface image of the sample. Therefore, a problem arises in that an accurate surface image is not obtained. In this respect, some scanning probe microscopes have a function of performing inclination correction on the surface image of the sample. For example, in the inclination correction, luminance of pixels (for example, pixels of one line) of the surface image of the surface, which should be horizontal at the proper posture, is extracted, and an image process is performed on the surface image of the sample by using a mean value, a median value, or the like of values of the luminance of the pixels.

FIG. 6 is a perspective view illustrating an example of a sample 100, which is an observation target, and illustrates only a part of the sample 100. A surface of the sample 100 is provided with a plurality of convex portions 101 extending in a straight line, the convex portions being formed side by side in parallel, with concave portions 102 interposed therebetween. For example, in a case where a semiconductor component is observed as the sample, the sample 100 having a surface shape as illustrated in FIG. 6 becomes an observation target in some cases.

In a case where inclination correction is performed on a surface image of the sample 100, for example, it is possible to extract luminance of pixels of the surface image corresponding to the concave portions 102 along a straight line 103 parallel to the convex portion 101 and to perform inclination correction based on a mean value, a median value, or the like of the luminance of the pixels.

[Patent Literature 1] JP-A-2014-211372

SUMMARY

As described above, in a case where the luminance of the pixels is extracted and inclination correction is performed, it is not possible to extract luminance of pixels along a straight line parallel to either direction of a main-scanning direction (X direction) or a sub-scanning direction (Y direction), in the related art. As illustrated in FIG. 6, when the straight line 103 is parallel to the Y direction, it is possible to extract luminance of pixels along the straight line 103. However, in a case where the sample 100 is placed in a direction in which the convex portions 101 are inclined in the X direction and the Y direction, it is not possible to extract luminance of pixels along the straight line 103.

In this case, luminance of pixels along a straight line through the convex portions 101 and the concave portions 102 is extracted, and thus it is not possible to appropriately perform inclination correction. Therefore, a user has to place the sample 100 while considering that the convex portions 101 need to extend in parallel with the X direction or the Y direction, and thus a problem arises in that placement work of the sample is complicated.

The invention is made in consideration of such circumstances described above, and an object thereof is to provide a scanning probe microscope and a surface image correcting method in which it is possible to simplify placement work of a sample.

(1) A scanning probe microscope according to the invention includes a cantilever, a scanning processor, and an inclination correcting processor. The cantilever is relatively displaced along a surface of a sample. The scanning processor performs scanning by causing the cantilever to be relatively displaced with respect to the surface of the sample in both directions of an X direction and a Y direction which intersect each other. The inclination correcting processor performs an image process for correcting inclination of a surface image to a Z direction intersecting the X direction and the Y direction on the surface image of the sample which has been acquired from scanning by the scanning processor. The inclination correcting processor extracts a plurality of pixels from the surface image on a straight line along a predetermined direction, corrects inclination of the surface image based on luminance of the extracted pixels, and performs an image process such that it is possible to extract the plurality of pixels along the one direction in a case where correction is performed on the surface image of the sample having a flat surface at least in the one direction intersecting the X direction and the Y direction.

According to such a configuration, in a case where the correction is performed on the surface image of the sample having the flat surface at least in the one direction intersecting the X direction and the Y direction, the plurality of pixels are extracted along the one direction, and the inclination of the surface image is corrected, based on the luminance of the extracted pixels. Consequently, since luminance of pixels is not extracted along a straight line through convex portions and concave portions, a user does not need to place the sample while considering that the one direction needs to extend to be parallel to the X direction or the Y direction. Hence, it is possible to simplify placement work of the sample.

(2) In a case where the correction is performed on the surface image of the sample having the flat surface at least in the one direction, the inclination correcting processor may extract the plurality of pixels which are oblique with respect to the X direction and the Y direction such that the predetermined direction substantially matches the one direction.

According to such a configuration, the direction (predetermined direction) when the plurality of pixels are extracted from the surface image of the sample on the straight line is obliquely set with respect to the X direction and the Y direction, thereby, substantially matching the one direction. Hence, regardless of a direction in which the sample is placed, it is possible to automatically extract a plurality of pixels along the predetermined direction that substantially matches the one direction and to correct inclination of the surface image based on the luminance of the extracted pixels.

(3) The scanning probe microscope may further include an image display processor. The image display processor rotates the surface image corrected by the inclination correcting processor, substantially matches the one direction to the X direction or the Y direction before rotation, and displays the surface image.

According to such a configuration, the surface image obtained after correcting the inclination is rotated, and thereby the one direction is caused to substantially match the X direction or the Y direction before the rotation, and the surface image is displayed. Therefore, the user more easily observes the surface image, than in a case where the surface image is displayed in a state in which the one direction is inclined with respect to the X direction and the Y direction as is.

(4) In a case where the correction is performed on the surface image of the sample having the flat surface at least in the one direction, the inclination correcting processor may extract the plurality of pixels after the surface image is rotated such that the one direction substantially matches the predetermined direction.

According to such a configuration, the surface image of the sample is rotated, and thereby the direction (predetermined direction) when the plurality of pixels are extracted from the surface image on the straight line substantially matches the one direction. Hence, regardless of the direction in which the sample is placed, it is possible to automatically extract a plurality of pixels along the predetermined direction that substantially matches the one direction and to correct inclination of the surface image based on the luminance of the extracted pixels.

(5) The inclination correcting processor may extract the plurality of pixels from one end portion to another end portion in the predetermined direction on the surface image.

According to such a configuration, the plurality of pixels are extracted from the one end portion to the other end portion of the surface image along the predetermined direction, and the inclination of the surface image is corrected, based on the luminance of the extracted pixels. Hence, it is possible to correct the inclination of the surface image based on the luminance of more pixels, and thus it is possible to improve accuracy of the inclination correction.

(6) There is provided a surface image correcting method according to the invention for correcting a surface image of a sample which has been acquired by a scanning probe microscope that includes a cantilever that is relatively displaced along a surface of the sample and a scanning processor that performs scanning by causing the cantilever to be relatively displaced with respect to the surface of the sample in both directions of an X direction and a Y direction which intersect each other, the surface image correcting method including an inclination correcting step. In the inclination correcting step, an image process is performed to correct inclination of the surface image to a Z direction intersecting the X direction and the Y direction on the surface image of the sample which has been acquired from scanning by the scanning processor. In the inclination correcting step, a plurality of pixels are extracted from the surface image on a straight line along a predetermined direction, inclination of the surface image is corrected based on luminance of the extracted pixels, and an image process is performed such that it is possible to extract the plurality of pixels along the one direction in a case where correction is performed on the surface image of the sample having a flat surface at least in the one direction intersecting the X direction and the Y direction.

(7) In the inclination correcting step, in a case where the correction is performed on the surface image of the sample having the flat surface at least in the one direction, the plurality of pixels which are oblique with respect to the X direction and the Y direction may be extracted such that the predetermined direction substantially matches the one direction.

(8) In the inclination correcting step, in a case where the correction is performed on the surface image of the sample having the flat surface at least in the one direction, the plurality of pixels may be extracted after the surface image is rotated such that the one direction substantially matches the predetermined direction.

(9) In the inclination correcting step, the plurality of pixels may be extracted from one end portion to another end portion in the predetermined direction on the surface image.

According to the invention, since luminance of pixels along a straight line through convex portions and concave portions is extracted, a user does not need to place a sample while considering that one direction needs to extend to be parallel to an X direction or a Y direction, and thus it is possible to simplify placement work of the sample.

DETAILED DESCRIPTION

1. Configuration of Scanning Probe Microscope

Figure 1:
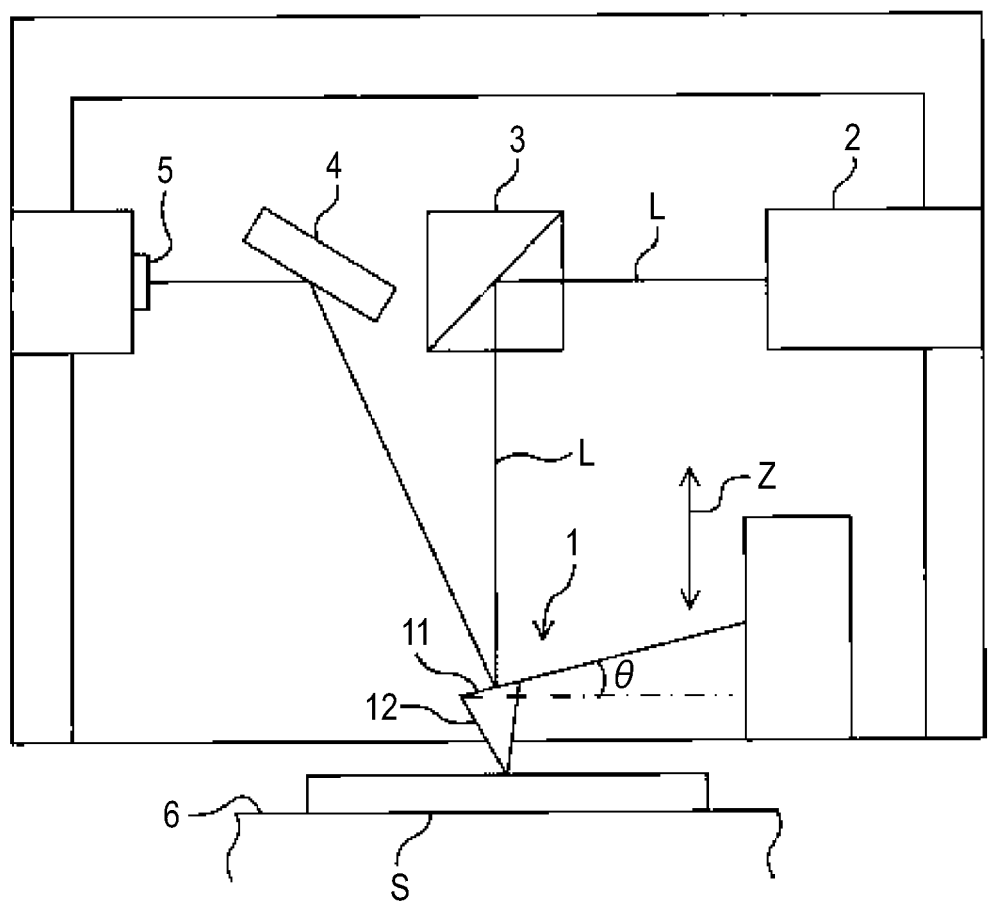
FIG. 1 is a conceptual diagram illustrating a configurational example of a scanning probe microscope according to an embodiment of the invention.

FIG. 1 is a conceptual diagram illustrating a configurational example of a scanning probe microscope according to an embodiment of the invention. The scanning probe microscope (SPM) includes a cantilever 1, an optical irradiation unit 2, a beam splitter 3, a mirror 4, an optical detection unit 5, and a sample stage 6. The cantilever 1 is caused to move along a surface of a sample S, and thereby it is possible to obtain a surface image (unevenness image) of the sample S placed on the sample stage 6.

For example, the optical irradiation unit 2 includes a laser beam source such as a semiconductor laser and irradiates the cantilever 1 with a light beam. The light beam, with which the optical irradiation unit 2 performs irradiation, is incident to the cantilever 1 through the beam splitter 3. The cantilever 1 is provided with a reflective surface 11, and reflected beam from the reflective surface 11 is reflected from the mirror 4 and is received by the optical detection unit 5. For example, a configuration including a photodiode such as a four-split photodiode can be employed as the optical detection unit 5.

For example, on an optical path from the optical irradiation unit 2 to the cantilever 1, another optical member such as a collimating lens or a focus lens (both lenses not illustrated) may be provided. In this case, after an irradiation beam from the optical irradiation unit 2 is changed into a parallel beam by the collimating lens, the parallel beam can be caused to focus on the focus lens and guided to a side of the cantilever 1.

In addition to the beam splitter 3, the collimating lens, the focus lens, and the like configure an optical system for guiding the irradiation beam from the optical irradiation unit 2 to the cantilever 1. However, the configuration of the optical system is not limited thereto, and a configuration may be employed, in which at least one of the optical members described above is not provided.

For example, the cantilever 1 is a very small member having a length of about 150 μm and a width of about 30 to 40 μm and is provided with a probe 12 on a surface on an opposite side to the reflective surface 11. The probe 12 is caused to move along the surface of the sample S, and thereby it is possible to obtain a surface image of the sample S.

Here, the reflective surface 11 of the cantilever 1 is inclined at a predetermined inclination angle θ with respect to a direction orthogonal to an optical axis L of the irradiation beam from the optical irradiation unit 2. Hence, in a case where the probe 12 of the cantilever 1 is caused to move along unevenness of the surface of the sample S, the cantilever 1 is bent, and the inclination angle θ of the reflective surface 11 changes. In this case, a position on the optical detection unit 5, at which the reflected beam from the reflective surface 11 is received, changes, and thereby a detection signal from the optical detection unit 5 changes. Therefore, it is possible to obtain the surface image of the sample S based on the detection signal from the optical detection unit 5.

In the embodiment, a configuration is employed, in which the cantilever 1 is displaced along the surface of the sample S; however, a configuration may be employed, in which the sample stage 6 is caused to move, and thereby the sample S is displaced with respect to the cantilever 1. In other words, a configuration may be employed, in which the cantilever 1 is relatively displaced along the surface of the sample S.

2. Configuration of Sample

Figure 2A:
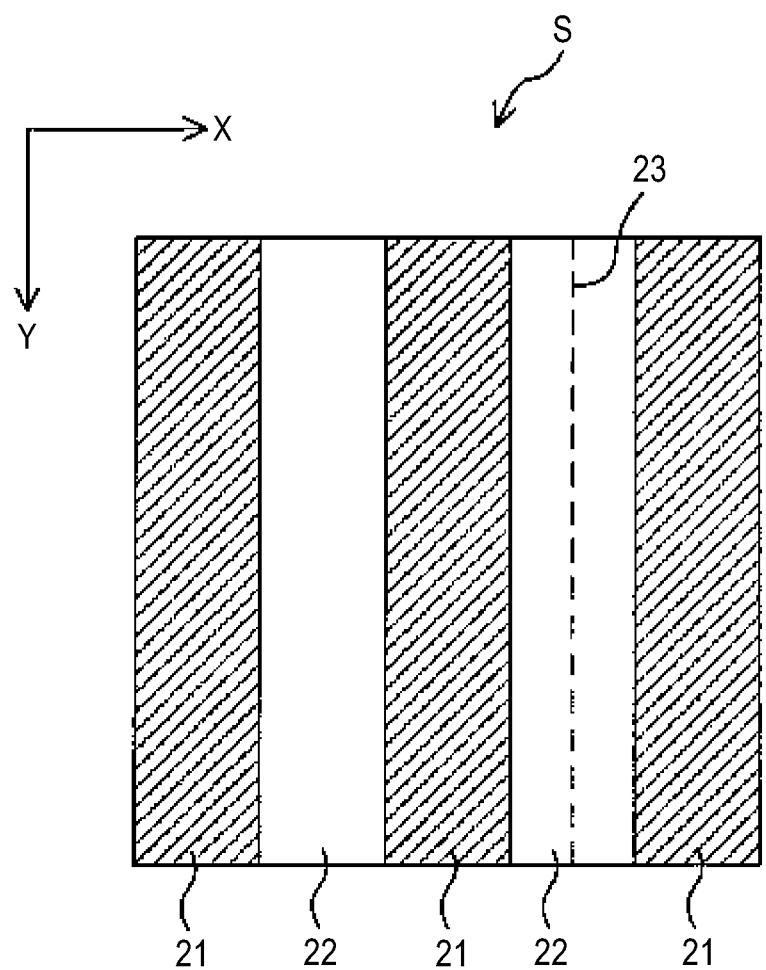
FIG. 2A is a plan view illustrating a configurational example of a sample.
Figure 2B:
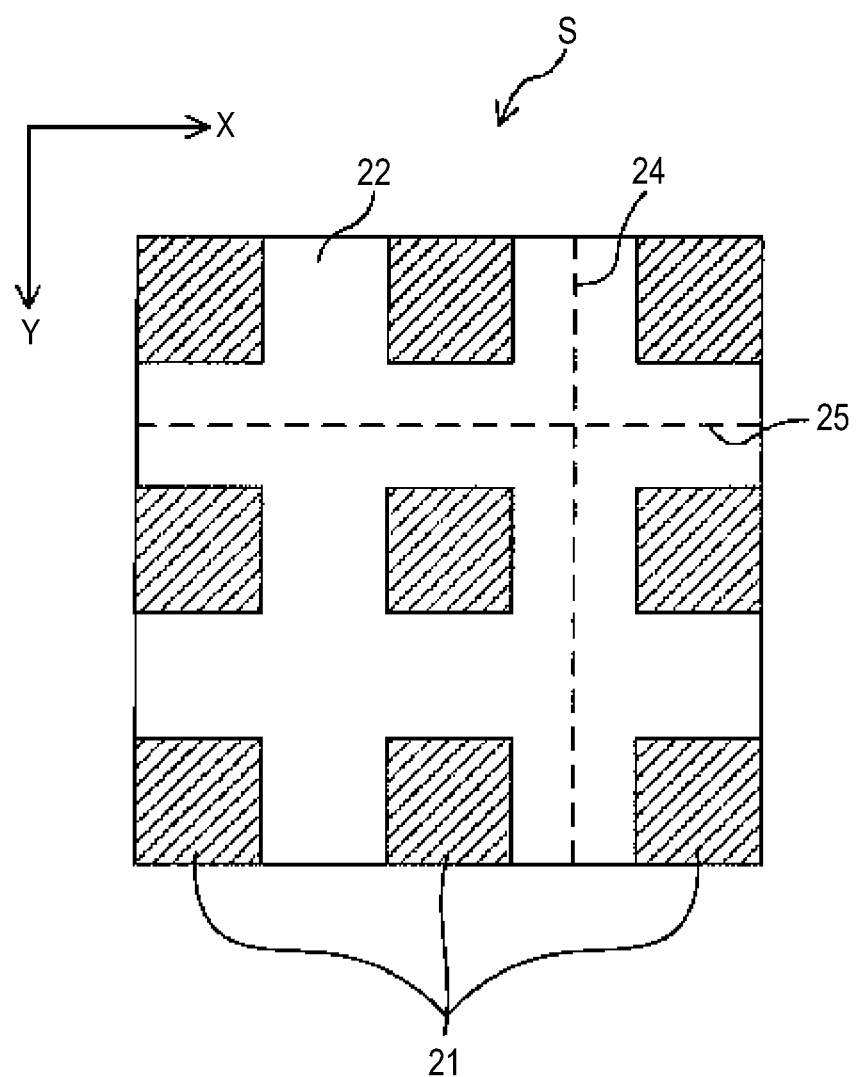
FIG. 2B is a plan view illustrating a configurational example of a sample.
Figure 2C:
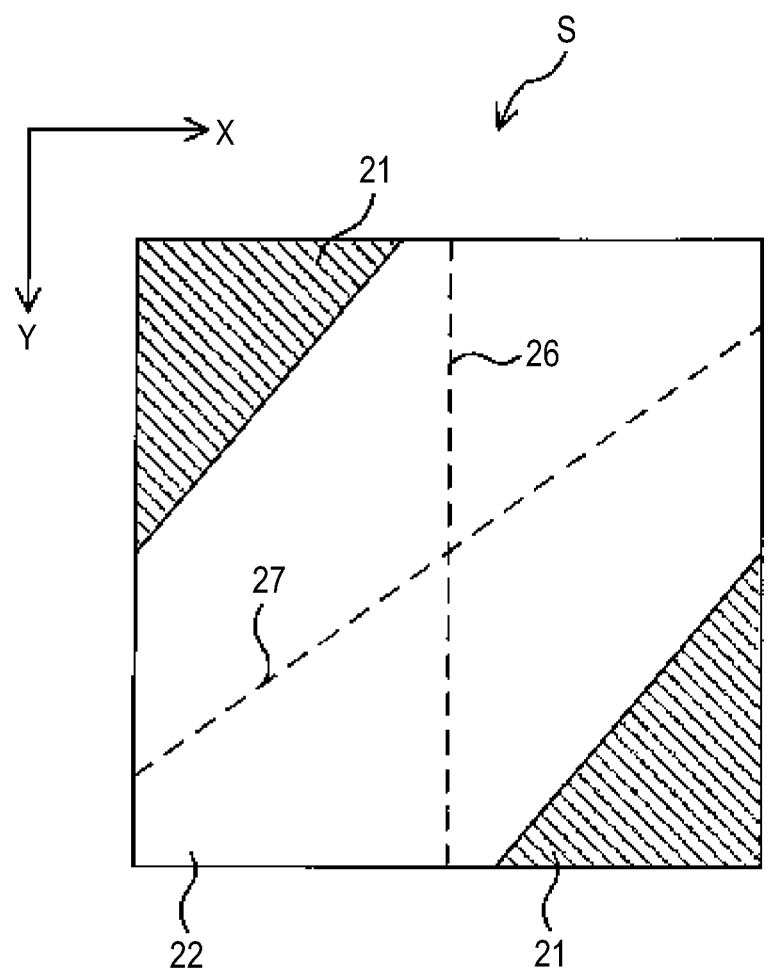
FIG. 2C is a plan view illustrating a configurational example of a sample.

FIGS. 2A to 2C are plan views illustrating a configurational example of the sample S. In a case where the sample S provided with a convex portion 21 and a concave portion 22 on the surface is an observation target, the scanning probe microscope according to the embodiment has a function of being capable of easily performing inclination correction on the surface image of the sample S. When the surface image of the sample S is acquired, the cantilever 1 is relatively displaced along the surface of the sample S in a main-scanning direction (X direction) and a sub-scanning direction (Y direction).

The convex portion 21 and the concave portion 22 formed on the surface of the sample S each have a surface (top surface) having some undulations; however, a step between the convex portion 21 and the concave portion 22 has a larger difference in height than the undulation. In FIGS. 2A to 2C, the convex portion 21 is illustrated by being hatched, and a boundary between a region (convex portion 21), which is hatched, and a region (concave portion 22), which is not hatched, is a step part between the convex portion 21 and the concave portion 22.

In an example in FIG. 2A, a surface of the sample S is provided with a plurality of convex portions 21 extending in a straight line, the convex portions being formed side by side in parallel with concave portions 22 interposed therebetween. Hence, as illustrated in FIG. 2A, in a case where the sample S is placed on the sample stage 6 such that the convex portions 21 extend in parallel with the Y direction, a surface image on which the convex portions 21 and the concave portions 22 appear alternately in the X direction is obtained.

For example, in a case where inclination correction is performed on the surface image of the sample S, luminance of pixels along a straight line 23 parallel to the Y direction is extracted. When the sample S is horizontally placed on the sample stage 6, values of the luminance of pixels extracted along the straight line 23 are substantially the same. However, in a case where the sample S is not horizontally placed on the sample stage 6, a surface, which should be horizontal in a proper posture, is inclined, and variations in the luminance based on such inclination appear on the surface image of the sample S.

In this respect, in the inclination correction, luminance of pixels (for example, pixels along the straight line 23) of the surface image of the surface, which should be horizontal at the proper posture, is extracted, and an image process is performed on the surface image of the sample S by using a mean value, a median value, or the like of values of the luminance of the pixels. Consequently, it is possible to obtain a surface image after the inclination correction by which the variations in the luminance based on the inclination of the sample S are removed.

In an example in FIG. 2B, a surface of the sample S is provided with a plurality of convex portions 21 arranged in a grid pattern, with the concave portions 22 interposed therebetween. Hence, as illustrated in FIG. 2B, in a case where the sample S is placed on the sample stage 6 such that the convex portions 21 are arranged in parallel with the X direction and the Y direction, a surface image on which the convex portions 21 and the concave portions 22 appear alternately in the X direction and the Y direction is obtained.

In a case where the inclination correction is performed on the surface image of the sample S as illustrated in FIG. 2B, it is possible to extract luminance of pixels not only along a straight line 24 parallel to the Y direction but also along a straight line 25 parallel to the X direction. In other words, luminance of the pixels along the straight line 24 or 25 parallel to the Y direction or the X direction, respectively, is extracted, and the inclination correction is performed on the surface image of the sample S based on the luminance of the pixels. In this manner, it is possible to obtain a surface image after the inclination correction.

In an example in FIG. 2C, a surface of the sample S is provided with a plurality of convex portions 21, with the concave portions 22 interposed therebetween; however, a configuration is employed in which the convex portions 21 are not regularly formed, unlike FIG. 2A or 2B. Even in the configuration, it is possible to extract luminance of the pixels along a straight line 26 parallel to the Y direction and to perform the inclination correction on the surface image of the sample S based on the luminance of the pixels.

When it is possible to extract luminance of pixels along a straight line 27 extending not in the Y direction but in a direction intersecting the X direction and the Y direction in the case of the sample S as illustrated in FIG. 2C, it is also possible to perform the inclination correction on the surface image of the sample S based on the luminance of the pixels.

In this manner, the sample S has a flat surface on which it is possible to draw the straight lines (straight lines 23 to 27 or the like) along at least one direction. The flat surface may be a surface along the surface of the concave portion 22 or may be a surface along the surface of the convex portion 21; however, the flat surface is preferably a flat surface on which it is possible to draw a straight line from one side to another side of the surface image of the sample S. Incidentally, the flat surface also includes a surface having some undulations smaller than the step between the convex portion 21 and the concave portion 22, an undulation due to minute foreign matter, or the like.

3. Electrical Configuration

Figure 3:
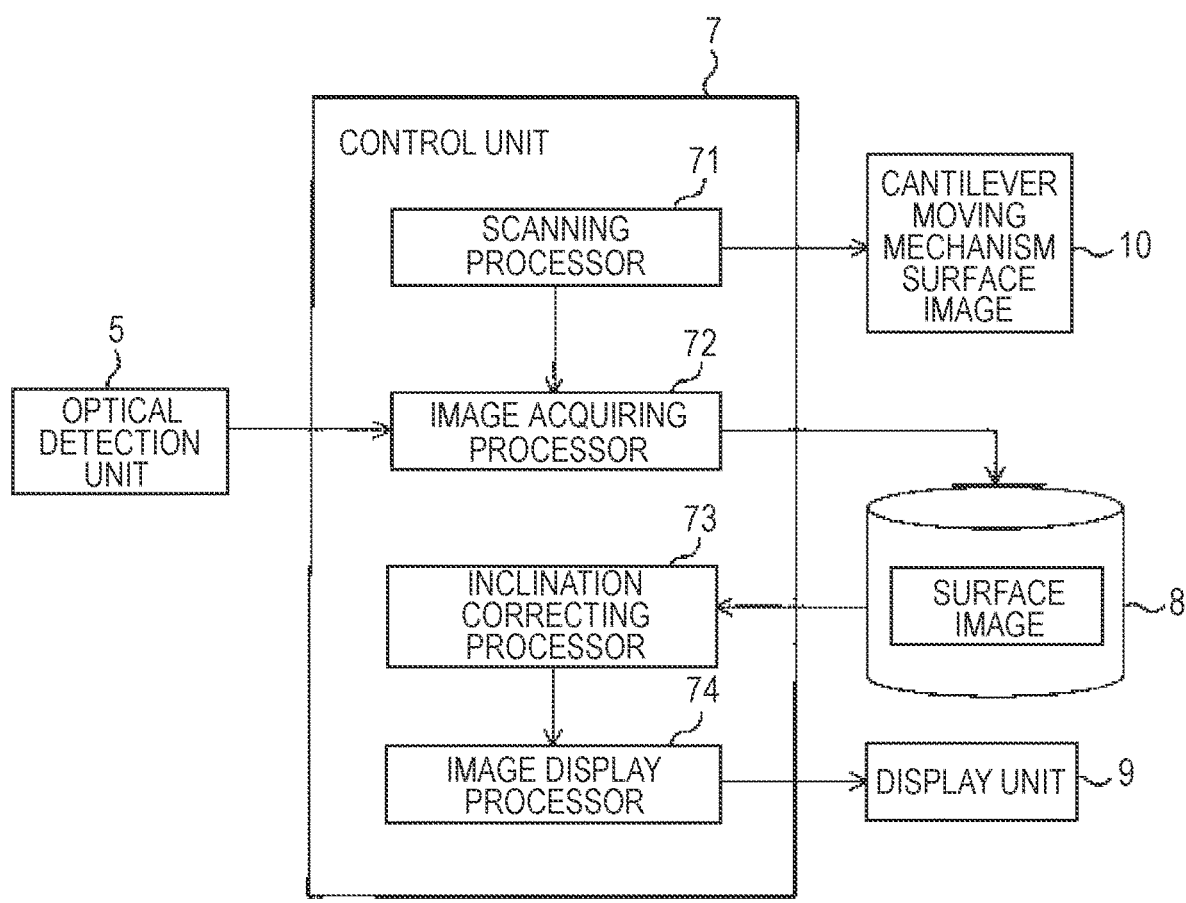
FIG. 3 is a block diagram illustrating an electrical configuration of the scanning probe microscope in FIG. 1.

FIG. 3 is a block diagram illustrating an electrical configuration of the scanning probe microscope in FIG. 1. The scanning probe microscope includes a control unit 7, a storage unit 8, a display unit 9, and the like. In addition, although not illustrated in FIG. 1, the scanning probe microscope further includes a cantilever moving mechanism 10 for moving the cantilever 1 in both of the X direction and the Y direction.

For example, the control unit 7 is configured to have a central processing unit (CPU). The CPU executes a program, thereby, functioning as a scanning processor 71, an image acquiring processor 72, an inclination correcting processor 73, an image display processor 74, and the like. For example, the storage unit 8 is configured of a random access memory (RAM), a hard disk, or the like. For example, the display unit 9 is configured of a liquid crystal display or the like, and is capable of displaying various types of images such as the surface image of the sample S.

The scanning processor 71 controls the cantilever moving mechanism 10, thereby relatively displacing the cantilever 1 with respect to the surface of the sample S. Consequently, it is possible to cause the cantilever 1 to scan the surface of the sample S in the main-scanning direction (X direction) and the sub-scanning direction (Y direction).

The image acquiring processor 72 acquires the surface image of the sample S based on a detection signal from the optical detection unit 5 while the scanning processor 71 causes the cantilever 1 to perform scanning. In this case, the luminance of the pixels of the surface image of the sample S has values obtained depending on strength of the detection signal from the optical detection unit 5. The surface image of the sample S, which has been acquired by the image acquiring processor 72, is stored in the storage unit 8.

The inclination correcting processor 73 performs an image process for correcting inclination of the surface image to a Z direction intersecting the X direction and the Y direction on the surface image of the sample S. Specifically, the inclination correcting processor 73 extracts the plurality of pixels from the surface image of the sample S on a straight line along a predetermined direction and corrects the inclination of the surface image in the Z direction based on the luminance of the extracted pixels.

In this case, when a mean value or a median value of values of the luminance of the extracted pixels is set as a reference value, for example, luminance differences between the pixels on the straight line are calculated with respect to the reference value. The luminance differences between the pixels on the straight line are computed to be added to or subtracted from luminance values of pixels aligned in a direction orthogonal to the straight line, and thereby it is possible to perform the inclination correction of the pixels of the entire surface image of the sample S. In the embodiment, the X direction and the Y direction are orthogonal to each other in a horizontal plane, and the Z direction is a vertical direction (refer to FIG. 1); however, the directions are not limited thereto, as long as the X direction, the Y direction, and the Z direction intersect each other.

The image display processor 74 displays, on the display unit 9, the surface image of the sample S after the inclination correction is performed by the inclination correcting processor 73. The image display processor 74 may be capable of displaying the surface image on the display unit 9 after an image process such as a rotation process for rotating the surface image of the sample S other than the inclination correction is performed on the surface image.

4. First Example of Inclination Correction

Figure 4A:
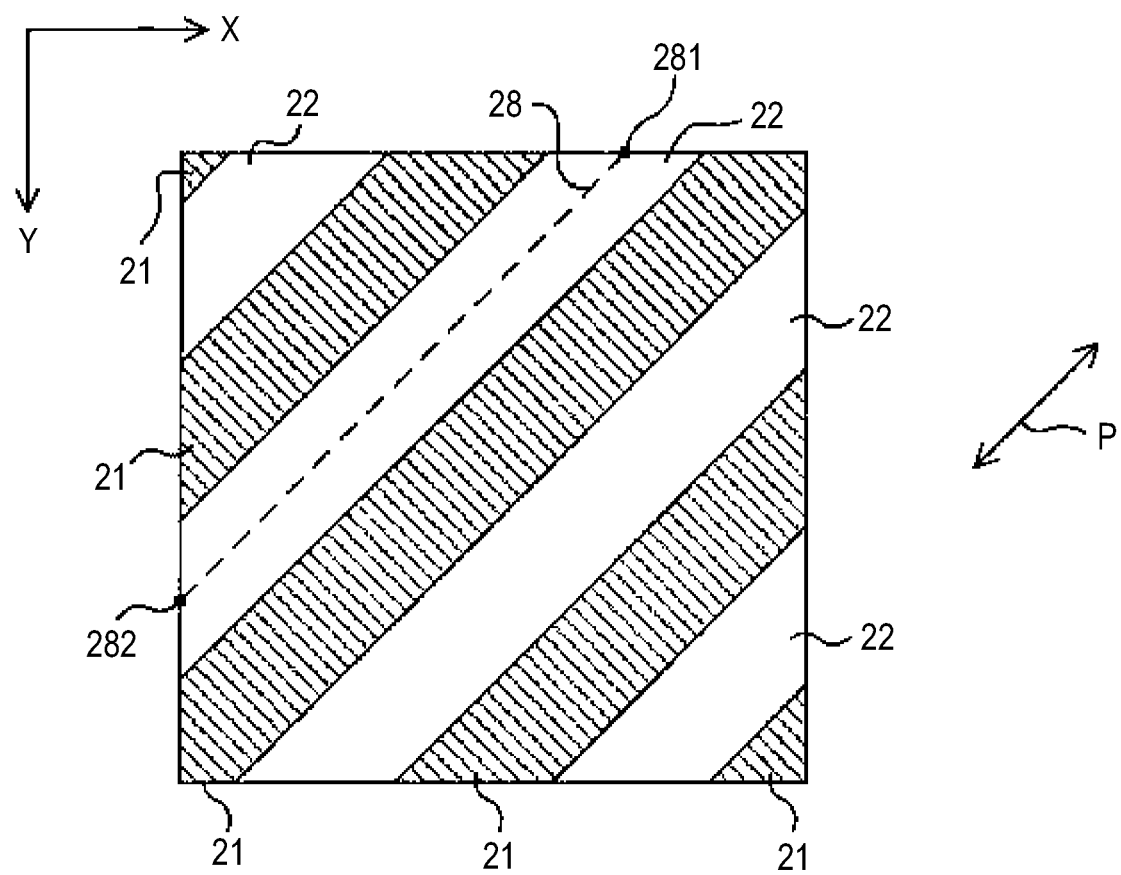
FIG. 4A is a view for describing a first example of inclination correction and illustrates an example of a surface image of the sample.
Figure 4B:
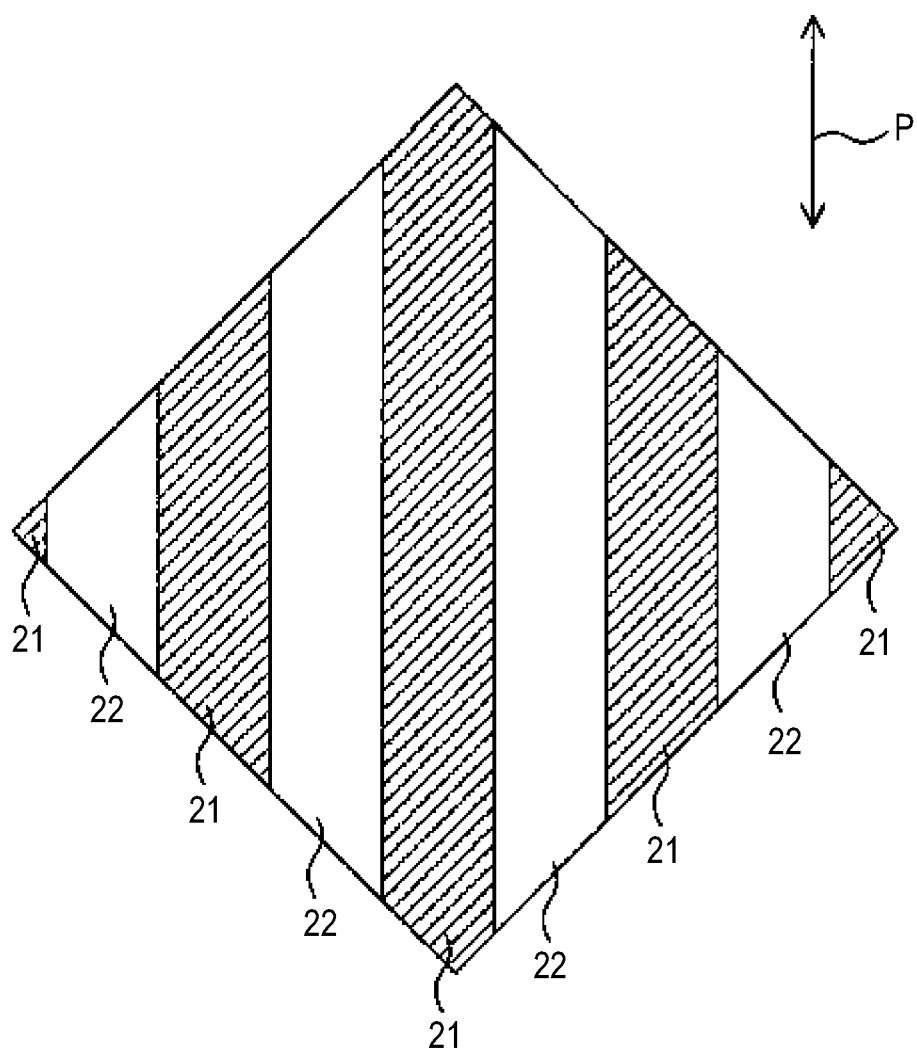
FIG. 4B is a view for describing the first example of the inclination correction and illustrates an example of the surface image of the sample.

FIGS. 4A and 4B are views for describing a first example of the inclination correction and illustrate an example of the surface image of the sample S. In this example, the sample S illustrated in FIG. 2A is placed on the sample stage 6 such that the convex portions 21 extend in one direction (P direction) intersecting the X direction and the Y direction, and the surface image (refer to FIG. 4A) of the sample S, which is acquired through scanning performed by the cantilever 1 in this state, is described.

In this case, similar to the case described in FIG. 2A, when luminance of pixels along a straight line parallel to the Y direction is extracted, luminance of pixels along a straight line through the convex portions 21 and the concave portions 22 is extracted. In this manner, it is not possible to appropriately perform the inclination correction. In this respect, in this example, the inclination correcting processor 73 is configured to extract a plurality of pixels which are oblique with respect to the X direction and the Y direction such that a direction (predetermined direction) of a straight line 28 when a plurality of pixels are extracted on one straight line substantially matches the P direction.

For example, a process for extracting an edge (step part between the edge the convex portion 21 and the concave portion 22) from the surface image of the sample S is performed, and an inclination angle of the P direction with respect to the X direction or the Y direction can be determined by calculating an inclination angle of the edge. However, the process is not limited to such a configuration and may employ a configuration in which a user manually inputs the inclination angle, for example.

In this example, in a case where the correction is performed on the surface image of the sample S having the flat surface in the P direction intersecting the X direction and the Y direction, the plurality of pixels are extracted along the P direction, and the inclination of the surface image is corrected, based on the luminance of the extracted pixels (inclination correcting step). Consequently, since luminance of pixels is not extracted along a straight line through the convex portions 21 and the concave portions 22, a user does not need to place the sample S while considering that the P direction needs to extend to be parallel to the X direction or the Y direction. Hence, it is possible to simplify placement work of the sample S.

In particular, in this example, the direction (predetermined direction) when the plurality of pixels are extracted from the surface image of the sample S on the straight line is obliquely set with respect to the X direction and the Y direction, thereby, substantially matching the P direction. Hence, regardless of the direction in which the sample S is placed, it is possible to automatically extract the plurality of pixels along the predetermined direction that substantially matches the P direction and to correct inclination of the surface image based on the luminance of the extracted pixels.

As illustrated in FIG. 4B, the surface image after the correction by the inclination correcting processor 73 may be rotated by the image display processor 74, and then may be displayed on the display unit 9. In this case, the surface image is rotated such that the P direction substantially matches the X direction or the Y direction (Y direction in the example in FIG. 4B). A rotation angle of the surface image in this case can be determined, based on an inclination angle of the P direction with respect to the X direction or the Y direction, which is calculated as described above.

In this manner, the surface image obtained after correcting the inclination is rotated, and thereby the P direction is caused to substantially match the X direction or the Y direction before the rotation, and the surface image (surface image illustrated in FIG. 4B) is displayed. Therefore, the user more easily observes the surface image, than in a case where the surface image (surface image illustrated in FIG. 4A) is displayed in a state in which the P direction is inclined with respect to the X direction and the Y direction as is.

In addition, in this example, the plurality of pixels are extracted from one end portion 281 to another end portion 282 of the surface image of the sample S in the predetermined direction (direction of the straight line 28), and the inclination of the surface image is corrected, based on the luminance of the extracted pixels. Hence, it is possible to correct the inclination of the surface image based on the luminance of more pixels, and thus it is possible to improve accuracy of the inclination correction.

However, the example is not limited to the configuration in which the plurality of pixels are extracted from the one end portion 281 to the other end portion 282 along the straight line 28, and a configuration may be employed, in which only a part of pixels on the straight line 28 are extracted, and the inclination of the surface image is corrected, based on the luminance of the extracted pixels.

5. Second Example of Inclination Correction

Figure 5:
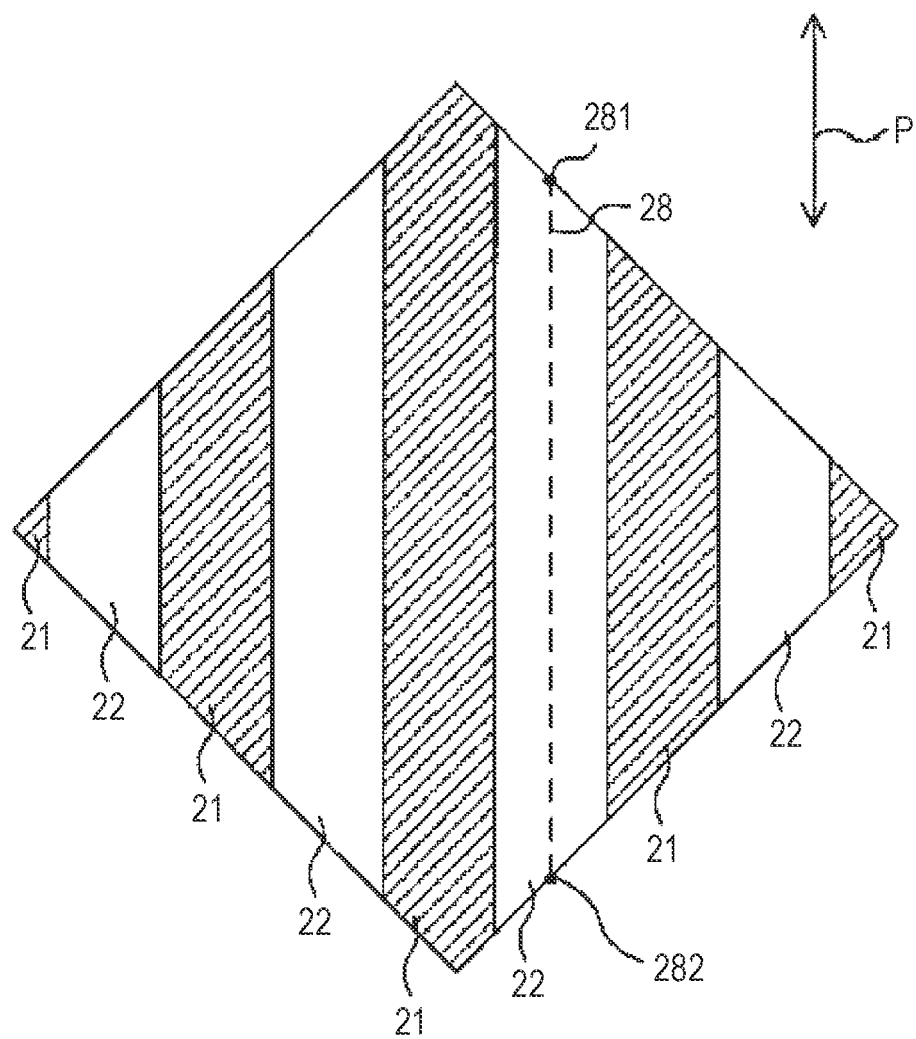
FIG. 5 is a view for describing a second example of the inclination correction and illustrates an example of a surface image of a sample.
Figure 6:
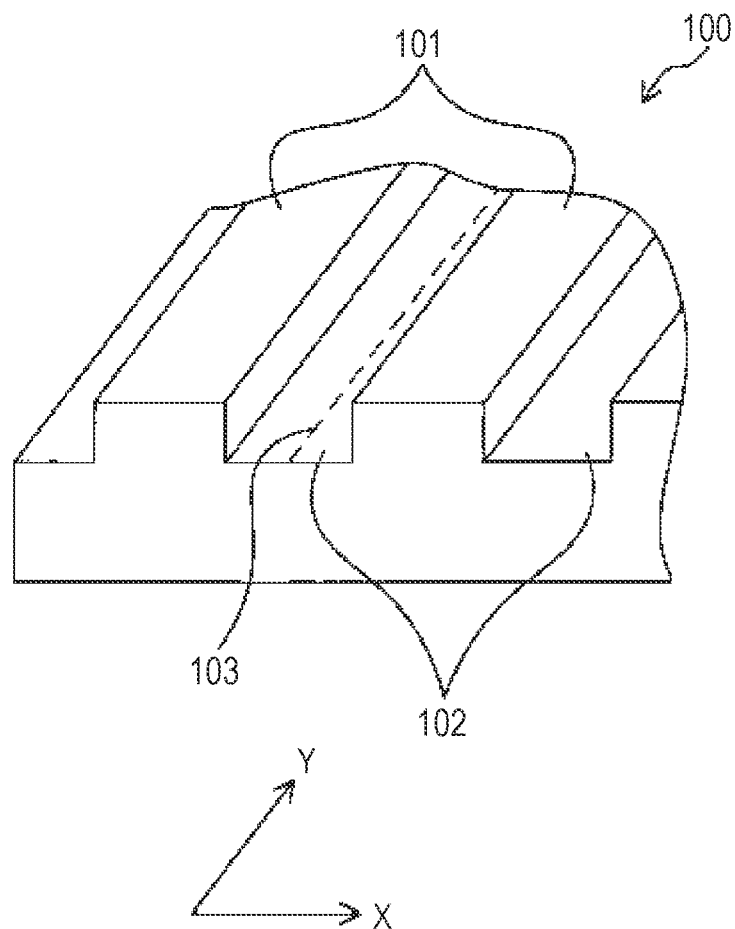
FIG. 6 is a perspective view illustrating an example of a sample, which is an observation target, and illustrates only a part of the sample.

FIG. 5 is a view for describing a second example of the inclination correction and illustrates an example of a surface image of the sample S. In this example, the sample S illustrated in FIG. 2A is placed on the sample stage 6 such that the convex portions 21 extend in the one direction (P direction) intersecting the X direction and the Y direction, and a state of rotating the surface image (refer to FIG. 4A) of the sample S, which is acquired through the scanning performed by the cantilever 1 in this state (refer to FIG. 5), is described.

In this example, the direction (predetermined direction) of the straight line 28 when the plurality of pixels are extracted on the one straight line is set to either the X direction or the Y direction before the rotation (in this example, the Y direction) in advance. In this respect, as illustrated in FIG. 5, a configuration is employed in which, after the P direction is caused to substantially match the predetermined direction (direction of the straight line 28) by rotating the surface image of the sample S, the plurality of pixels are extracted.

In this example, in a case where the correction is performed on the surface image of the sample S having the flat surface in the P direction intersecting the X direction and the Y direction, the plurality of pixels are extracted along the P direction, and the inclination of the surface image is corrected, based on the luminance of the extracted pixels (inclination correcting step). Consequently, since luminance of pixels is not extracted along a straight line through the convex portions 21 and the concave portions 22, a user does not need to place the sample S while considering that the P direction needs to extend to be parallel to the X direction or the Y direction. Hence, it is possible to simplify the placement work of the sample S.

In particular, in this example, the surface image of the sample S is rotated, and thereby the direction (predetermined direction) when the plurality of pixels are extracted from the surface image on the straight line substantially matches the P direction. Hence, regardless of the direction in which the sample S is placed, it is possible to automatically extract the plurality of pixels along the predetermined direction that substantially matches the P direction and to correct the inclination of the surface image based on the luminance of the extracted pixels.

In addition, in this example, the plurality of pixels are extracted from the one end portion 281 to the other end portion 282 of the surface image of the sample S in the predetermined direction (direction of the straight line 28), and the inclination of the surface image is corrected, based on the luminance of the extracted pixels. Hence, it is possible to correct the inclination of the surface image based on the luminance of more pixels, and thus it is possible to improve accuracy of the inclination correction.

However, the example is not limited to the configuration in which the plurality of pixels are extracted from the one end portion 281 to the other end portion 282 along the straight line 28, and a configuration may be employed, in which only a part of pixels on the straight line 28 are extracted, and the inclination of the surface image is corrected, based on the luminance of the extracted pixels.

A program for causing a computer to execute a surface image correcting method according to the invention may be provided. In this case, a configuration may be employed, in which the program is provided in a state of being stored in a storage medium, or a configuration may be employed, in which the program is provided via wired communication or wireless communication.

The invention claimed is:

1. A scanning probe microscope comprising:
    a cantilever that is relatively displaced along a surface of a sample;
    a scanning processor that performs scanning by causing the cantilever to be relatively displaced with respect to the surface of the sample in both directions of an X direction and a Y direction which intersect each other; and
    an inclination correcting processor that performs an image process for correcting inclination of a surface image to a Z direction intersecting the X direction and the Y direction on the surface image of the sample which has been acquired from scanning by the scanning processor,
    wherein the inclination correcting processor extracts a plurality of pixels from the surface image on a straight line along a predetermined direction, corrects inclination of the surface image based on luminance of the extracted pixels, and performs an image process such that it is possible to extract the plurality of pixels along the one direction in a case where correction is performed on the surface image of the sample having a flat surface at least in the one direction intersecting the X direction and the Y direction.

2. The scanning probe microscope according to claim 1, wherein, in a case where the correction is performed on the surface image of the sample having the flat surface at least in the one direction, the inclination correcting processor extracts the plurality of pixels which are oblique with respect to the X direction and the Y direction such that the predetermined direction substantially matches the one direction.

3. The scanning probe microscope according to claim 2, further comprising:
an image display processor that rotates the surface image corrected by the inclination correcting processor, substantially matches the one direction to the X direction or the Y direction before rotation, and displays the surface image.

4. The scanning probe microscope according to claim 1, wherein, in a case where correction is performed on the surface image of the sample having the flat surface at least in the one direction, the inclination correcting processor extracts the plurality of pixels after the surface image is rotated such that the one direction substantially matches the predetermined direction.

5. The scanning probe microscope according to claim 1, wherein the inclination correcting processor extracts the plurality of pixels from one end portion to another end portion in the predetermined direction on the surface image.

6. A surface image correcting method for correcting a surface image of a sample which has been acquired by a scanning probe microscope that includes a cantilever that is relatively displaced along a surface of the sample and a scanning processor that performs scanning by causing the cantilever to be relatively displaced with respect to the surface of the sample in both directions of an X direction and a Y direction which intersect each other, the method comprising:
an inclination correcting step of performing an image process for correcting inclination of the surface image to a Z direction intersecting the X direction and the Y direction on the surface image of the sample which has been acquired from scanning by the scanning processor,
wherein, in the inclination correcting step, a plurality of pixels are extracted from the surface image on a straight line along a predetermined direction, inclination of the surface image is corrected based on luminance of the extracted pixels, and an image process is performed such that it is possible to extract the plurality of pixels along the one direction in a case where correction is performed on the surface image of the sample having a flat surface at least in the one direction intersecting the X direction and the Y direction.

7. The surface image correcting method according to claim 6, wherein, in the inclination correcting step, in a case where the correction is performed on the surface image of the sample having the flat surface at least in the one direction, the plurality of pixels which are oblique with respect to the X direction and the Y direction are extracted such that the predetermined direction substantially matches the one direction.

8. The surface image correcting method according to claim 6, wherein, in the inclination correcting step, in a case where the correction is performed on the surface image of the sample having the flat surface at least in the one direction, the plurality of pixels are extracted after the surface image is rotated such that the one direction substantially matches the predetermined direction.

9. The surface image correcting method according to claim 6, wherein, in the inclination correcting step, the plurality of pixels are extracted from one end portion to another end portion in the predetermined direction on the surface image.

* * * * *